United States Patent [19]

Trokhan

[11] Patent Number: 4,469,735
[45] Date of Patent: Sep. 4, 1984

[54] EXTENSIBLE MULTI-PLY TISSUE PAPER PRODUCT

[75] Inventor: Paul D. Trokhan, Hamilton, Ohio

[73] Assignee: The Procter & Gamble Company, Cincinnati, Ohio

[21] Appl. No.: 358,544

[22] Filed: Mar. 15, 1982

[51] Int. Cl.³ .............................................. B32B 7/00
[52] U.S. Cl. ................................... 428/154; 428/195; 428/198; 428/212
[58] Field of Search ................ 428/154, 195, 198, 212

[56] References Cited

U.S. PATENT DOCUMENTS

| | | | |
|---|---|---|---|
| 3,301,746 | 1/1967 | Sanford et al. | 162/113 |
| 3,414,459 | 12/1968 | Wells | 428/180 |
| 3,544,420 | 12/1970 | Murphy et al. | 428/54 |
| 3,615,976 | 10/1971 | Endres | 428/113 |
| 3,650,882 | 3/1972 | Thomas | 428/154 |
| 3,953,638 | 4/1976 | Kemp | 428/154 |
| 4,072,557 | 2/1978 | Schiel | 162/111 |
| 4,100,017 | 7/1978 | Flautt | 428/154 |
| 4,191,609 | 3/1980 | Trokhan | 162/113 |

FOREIGN PATENT DOCUMENTS 879436 8/1971 Canada.
1212473 11/1970 United Kingdom.

Primary Examiner—James J. Bell
Attorney, Agent, or Firm—Thomas J. Slone; Fredrick H. Braun; Richard C. Witte

[57] ABSTRACT

An extensible multi-ply tissue paper product having high tensile energy absorption (TEA); high liquid absorbency; and, preferably, high tensile strength efficiency. The product comprises plies which are preferably embossed and discontinuously adhered together. The product has high tensile energy absorption by virtue of having substantial extensibility in the machine direction which, preferably, results from its constituent plies having substantial MD extensibility induced by having undergone wet and/or dry foreshortening during their manufacture. The product has synergistically high liquid absorbency by virtue of at least two plies of the product having sufficiently different stress/strain properties that one ply will sufficiently constrain unadhered portions of the other ply from being elongated in the plane of the paper when wetted that such unadhered portions of the constrained ply will pucker in the Z-direction as its foreshortening-induced internal stresses are relieved. Preferably, the constraining ply is high bulk, wet-microcontracted tissue paper, and the other ply is dry-foreshortened tissue paper: e.g., dry-creped tissue paper. Also, the plies of preferred embodiments preferably have nominally equal MD extensibilities at rupture. Such preferred products have high tensile strength efficiency which is manifested by their having monomodal stress/strain characters. Embodiments of the invention such as two and three ply paper towels are especially useful for spill wipe-up applications.

33 Claims, 11 Drawing Figures

EXTENSIBLE MULTI-PLY TISSUE PAPER PRODUCT

TECHNICAL FIELD

This invention pertains to highly absorbent paper products: particularly soft, high bulk tissue paper products comprising two or more highly extensible plies of tissue paper having substantially different stress/strain properties: preferably at least through the lowest one-third of the range of MD extensibility of the product.

CROSS-REFERENCE TO RELATED APPLICATION

Reference is made to a concurrently filed patent application entitled "Wet-Microcontracted Paper and Method of Making Such Paper".

BACKGROUND ART

U.S. Pat. No. 3,953,638 which issued to Clifford B. Kemp on Apr. 27, 1976 discloses a Multi-Ply Absorbent Wiping Product Having Relatively Inextensible Center Ply Bonded Tp Highly Extensible Outer Plies, and concomitant methods. Such a product is stated to have superior caliper and bulk impresson when wet due to the fact that the unadhered areas of the extensible outer plies expand in the Z-direction (i.e., out of the plane of the paper) when the structure becomes wetted. That is, in such a product wherein the extensible outer plies are creped tissue paper, wetting causes crepe induced stresses to be relieved. Were the outer plies not constrained by the relatively inextensible center ply they would become elongated in the plane of the paper when wetted. However, being so constrained by a relatively inextensible center ply, the extensible outer plies expand outwardly (i.e., pucker in the Z-direction of the product) when the product is wetted. Such paper has, however, low tensile energy absorption relative to embodiments of the present invention, all other things being equal, and does not have a monomodal stress/strain character as do preferred embodiments of the present invention as is discussed in greater detail hereinafter.

U.S. Pat. No. 3,615,976 which issued to Dan D. Endres et al on Oct. 26, 1971 discloses a Method of Producing a High Bulk Macrocrepe Product which, during its manufacture, is dampened to effect puckering of creped wadding to precipitate macrocrepe and then dried to preserve the macrocrepe. The creped wadding is secured by adhesive in well spaced zones to a drawn synthetic fiber web which is substantially unaffected by the dampening.

U.S. Pat. No. 3,650,882 which issued to Gordon D. Thomas on Mar. 21, 1972 discloses a Multi-Ply Paper Towel having an elastically extensible inner ply of creped tissue disposed between less extensible, embossed outer plies.

U.S. Pat. No. 4,100,017 which issued to Thomas Joseph Flautt, Jr. on July 11, 1978 discloses a Multi-Ply Tissue Product wherein, for example, plies of dissimilar creping characteristics are juxtaposed with less resultant caliper loss than normally precipitated by juxtaposing similarly creped plies.

U.S. Pat. No. 3,544,420 which issued to James A. Murphy et al on Dec. 1, 1970 discloses a Creped Tissue Product comprising bias oriented plies. The product is stated to be extensible in both the longitudinal and transverse directions and is said to have unusually good strength and resistance to bursting, particularly in the transverse direction albeit, preferably, the plies are identically creped.

U.S. Pat. No. 4,072,557 which issued to Christian Schiel on Feb. 7, 1978 discloses a Method And Apparatus For Shrinking A Traveling Web Of Fibrous Material which entails a differential velocity transfer of a paper web in the wet-end of a papermaking machine to effect shrinking (i.e., wet-foreshortening of the web). Wet-foreshortened paper is also disclosed in British Pat. No. 1,212,473 which was published Nov. 18, 1970 and in Canadian Pat. No. 879,436 which issued Aug. 31, 1971; and both of which patents were derived from Finnish Pat. Application No. 561/68 which has a priority date of Mar. 1, 1968.

As compared to the background art, the present invention provides a highly absorbent multi-ply tissue product wherein extensible plies having substantial individual tensile strengths but sufficiently different stress/strain properties or stress/strain characters to synergistically interact to effect high wet bulk and liquid absorbency; and high tensile energy absorption. Preferably, the plies have sufficiently matched elongation properties that their tensile strengths are additive throughout the stress/strain domain of the product which product is accordingly characterized by a monomodal stress/strain property. A monomodal stess/strain property for such a multi-ply tissue paper product is hereby defined as a stress/strain curve having a single peak whereat all of the plies rupture virtually simultaneously as compared to a bimodal or multi-modal stress/strain property for two-ply or multi-ply products, respectively, which results from individual plies rupturing at different strain values.

DISCLOSURE OF THE INVENTION

In accordance with one aspect of the invention, an extensible multi-ply product is provided which comprises two extensible plies having at least ten percent extensiblity in a primary direction and sufficiently different stress/strain properties—preferably through the lowest one-third of range of extensibility of the product in the primary direction—that unadhered portions of one ply will pucker in the Z-direction when the product is wetted; and which plies preferably have substantially equal elongations at rupture. Such unadhered portions which are free to pucker are preferably provided by discontinuously bondng the plies together. The primary direction is preferably the machine direction, and the MD elongation at rupture of one ply is preferably from about eighty to about one-hundred-twenty percent (80–120%) of the other ply; and, more preferably, from about ninety to about one-hundred-ten percent (90–110%) of the other ply; most preferably when wet. Each ply has substantial MD extensibility by virtue, preferably, of being MD foreshortened after being wet laid. Preferably, each ply is so foreshortened from about ten to about forty percent; and more preferably from aout fifteen to about thirty percent. Preferably, at least one of the plies has its MD extensibility imparted by virtue of being MD foreshortened in the wet end of a papermaking machine without substantial compaction while the fiber consistency immediately upstream from the point of foreshortening is in the range of from about ten to thirty percent, and more preferably from about ten to twenty percent, and most preferably from about ten to fifteen percent. Also, preferably, another ply has its MD extensibility and internal stresses imparted by virtue of being MD dry-foreshortened: for example, by being dry-creped.

BRIEF DESCRIPTIONS OF THE DRAWINGS

While the specification concludes with claims particularly pointing out and distinctly claiming the subject matter regarded as forming the present invention, it is believed the invention will be better understood from the following description taken in conjunction with the accompanying drawings in which:

DETAILED DESCRIPTION OF THE INVENTION

Figure 1:
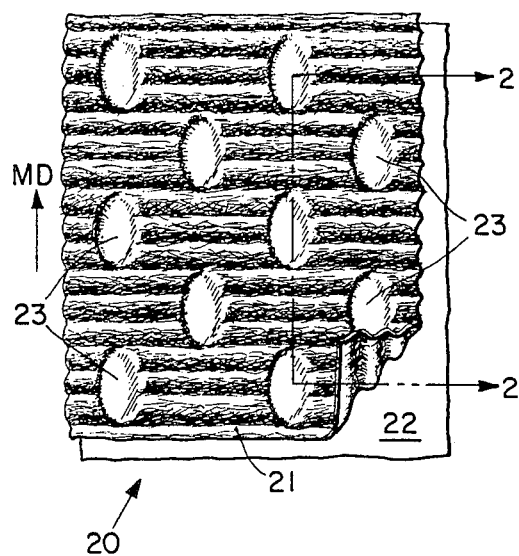
FIG. 1 is a somewhat schematic, enlarged scale, plan view of a partially peeled apart fragmentary portion of an illustrative two-ply tissue paper product embodiment of the present invention.

FIG. 1 is a plan view of a fragmentary portion of a two-ply tissue paper product 20 which is an exemplary embodiment of the present invention. Product 20 comprises a first ply 21 and a second ply 22 which plies are adhered together at only the spaced discrete areas designated adhered regions 23; and the remaining portions of each ply are not adhered to the other ply.

Basically, referring to the exemplary two-ply product 20, FIG. 1, plies 21 and 22 are so made that they each have greater than ten percent (10%) MD extensibility; ply 22 is made to have a substantially higher stress/strain property or curve than ply 21 through the lowest one-third of the range of MD elongation of product 20; and plies 21 and 22 are preferably made to have substantially equal strain values at rupture. The differences between their stress/strain properties precipitates puckering of unadhered porions of ply 21 when the product is wetted; and the puckering precipitates high wet bulk and liquid absorbency for the product. Indeed, such puckering is best precipitated by saturating a flat sample of product 20 with water while it is lying on a flat surface and without applying any tensile stress to the sample or inducing any MD strain in the sample. Accordingly, the pertinent portions of the stress/strain curves of plies 21 and 22 are the initial, low stress/strain portions. In most such two-ply products embodying the present invention, however, the stress/strain (i.e., the constrainer ply) curve of ply 22 will be substantially higher than the stress/strain curve of ply 21 (i.e., the extender or puckering ply) through the lowest one-third of the principal portion of the stress/strain curve of the product which extends from the zero stress level (i.e., the X-axis intercept) to the level of stress at which a first ply of the product ruptures. For this reason, such embodiments of the invention may be characterized by these elevational relationships among the stess/strain curves of the plies and the product although it is not intended to thereby limit the present invention to products having such stress/strain relationships over the above described lowest one-third of the respective principal stress/strain ranges of the products.

Continuing with the brief description of the invention, product 20, FIG. 1, has high tensile energy absorption as a result of both plies having greater than ten percent (10%) extensibility; and the substantially equal strain values at rupture cause the preferred product to be strength efficient as is manifest by a monomodal stress/strain character. That is, the strengths of the plies 21 and 22 of the preferred product 20 are additive throughout virtually their entire domains as opposed, for example, to ply strengths only being additive until one-ply breaks in a two-ply product comprising inmatched rupture-strain plies having substantial individual MD tensile strengths as is manifest by such products having bimodal stress/strain characters. Therefore, all other things being equal, a monomdal stress/strain multi-ply tissue product will have a higher breaking strength than a multi-modal stress/strain product comprising substantially identical plies but for their elongation at rupture values. Indeed, it is believed that consumers perceive a product failure when they perceive the breaking of one ply so, all other things being equal, a bimodal stress/strain product is perceived to not be as good insofar as product strength is concerned as a monomodal stress/strain product comprising plies having substantial individual tensile strengths. However, bimodal products having high tensile energy absorption derived from all of its constituent plies having substantial elongation are perceived by consumers to have better strength than similar products having lower tensile energy absorption. Parenthetically, in a product wherein one ply has relatively trivial MD tensile strength, the product could have a monomodal stress/strain character albeit comprising plies having inmatched rupture-strain values.

By way of background, the stress/strain data and resulting stess/strain curves presented in FIGS. 3 through 11, inclusive, and as used herein were obtained by testing samples having gauge lengths of four inches (about 10 cm) and which were one inch (2.54 cm.) wide by applying and recording tensile force in the machine-direction (MD) of the samples in an apparatus which stretched the samples at a rate of about four inches per minute (about 10 cm. per minute). Thus, whereas stress per se is force per unit of cross-sectional area, the graphed stress data are presented in grams force tensile strength per unit of saple width. Also these stress/strain graphs were derived from testing several replicate samples—generally four—and averaging the data therefrom.

Foreshortening as used herein is defined as reducing the length of a web in the macroscopic sense by proportionally reducing the length of each minute incremental length portion of the web. For example, a web is said to be wet-foreshortened in the machine direction in a papermaking machine when the web is transferred at a relatively low fiber consistency from a carrier or forming wire traveling at velocity $V_1$ to a slower moving transfer fabric traveling at a velocity $V_2$; and the degree of wet-foreshortening is defined as $(V_1-V_2)/V_1$ expressed as a percentage. Similarly, a web is said to be dry-foreshortened in the machine direction when it is dry-creped or crinkled or the like to effect reducing its length in the machine direction. For example, a web may be dry-foreshortened by dry-creping it from a creping cylinder having a peripheral velocity of $V_2$ with a creping/doctor blade, and reeling the paper at a velocity $V_4$ which is slower than $V_2$. Nominally, dry-creping is effected at a web fiber consistency of about eighty-five percent or more; and generally is effected at web consistencies of ninety-five percent or more. The degree of dry-foresortening/dry-creping is then defined as $(V_2-V_4)/V_2$ expressed as a percentage. Moreover, in papermaking machines having suitabe geometries and speed control equipment, a web can be both wet-foreshortened and dry-foreshortened (e.g., dry-creped) in which event the total degree of foreshortening is defined using the above velocity relationships as $(V_1-V_4)/V_1$ expressed as a percentage.

Referring again in FIG. 1, ply 21 is extensible tissue paper which preferably has a relatively high degree of extensibility of virtue of being dry-creped or otherwise being dry-foreshortened. The corrugated appearance of the unadhered/unembossed portions of ply 21 in FIG. 1 is, albeit greatly exaggerated, intended to represent a relatively uniformly creped paper sheet such as disclosed in U.S. Pat. No. 3,301,746 which issued Jan. 31, 1967 to L. H. Sanford and J. B. Sisson. Such paper is characterized by relatively uniform crepe, a relatively low stress/strain modulus through its low and intermediate one-third ranges of MD extensibility, and a relatively high modulus through the highest one-third of its range of MD extensibility to the level of strain at which it ruptures. Relatively little stress is required to pull most of the crepe out of such paper; and, after most of the crepe has been pulled out, relatively little additional strain results as the level of stress is increased sufficiently to break the paper. The machine direction strain at which rupture of such dry-creped paper occurs is directly related to the degree of foreshortening of the paper which is effected by dry-creping, and the rupture stress value (i.e., the level of machine-direction stress at which rupture occurs) is dependent on the strength property of the papermaking furnish (i.e., the fibers and additives, if any) as well as the degree and type of bonding within the paper. To some extent it is also dependent on the impact angle of the creping blade: greater impact angles causing less tensile strength reduction due to dry-creping than smaller impact angles.

Ply 22, FIG. 1, is extensible tissue paper having a higher stress/strain modulus through the lowest one-third of its range of MD extensibility than Ply 21, and preferably has all or a substantial portion of its MD extensibility imparted by virtue of undergoing substantial machine-direction foreshortening in the wet-end of a papermaking machine: i.e., wet-foreshortening. Preferably, this is effected by transferring the web from a carrier fabric to a substantially slower moving open-weave transfer fabric without substantial overall compaction while the web has a relatively low fiber consistency so that the paper has high bulk/low density. Such paper is hereinafter alternatively designated wet-microcontracted paper or WMC-paper.

While not intending to be bound by a theory of operation, it is believed that the fibers of wet-foreshortened paper in general, and of WMC-paper in particular are somewhat folded and bonded together in such a way that applied MD-stress precipitates unfolding and/or straightening of the fibers as interfiber bonds are peeled apart. Thus, it is believed that the higher stress/strain modulus through the lowest one-third of the range of MD extensibility of such paper as compared to dry-creped paper is due to the stress required to peel the interfiber bonds apart in addition to unfolding and/or straightening the fibers per se, whereas dry-foreshortening does not precipitate such additional interfiber bonds which must be peeled apart to pull dry-foreshortening induced stretch out of the paper. Indeed, dry-creped paper acts somewhat like a multiplicity of freely hinged panels which offer relatively little resistance to unfolding: at least in the low and intermediate ranges of its MD extensibility.

The foregoing description of an exemplary embodiment of the present invention comprising plies 21 and 22 which are, preferably, dry-foreshortened and wet-foreshortened, respectively, is not intended to preclude one or both plies from being hybrids thereof so long as they in fact have sufficiently different low-range stress/strain properties that one will constrain the other ply from elongating in the plane of the paper when wetted and thereby precipitate puckering of unadhered portions of the other ply: and which plies, preferably, have substantially equal elongation at rupture values.

Figure 2:
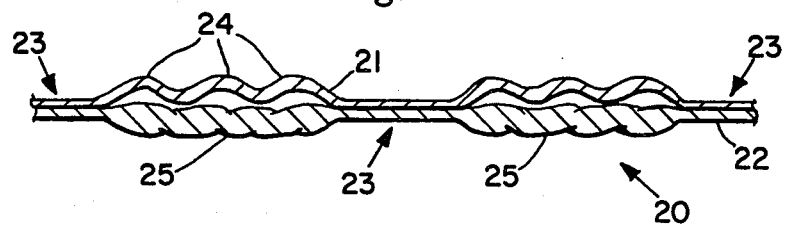
FIG. 2 is a somewhat schematic, fragmentary sectional view taken along line 2—2 of FIG. 1.
Figure 3:
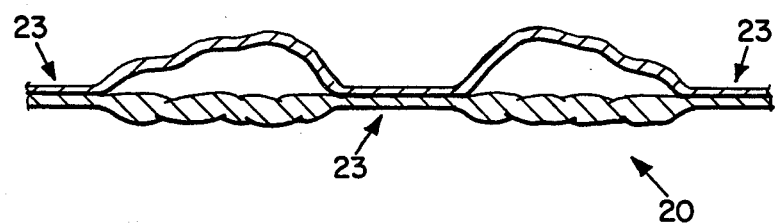
FIG. 3 is a view of the illustrative product shown in FIG. 2 after the product has been wetted.

FIG. 2 is a somewhat schematic sectional view of the exemplary product 20 taken along line 2—2 thereof; and wherein the crepe induced undulations of ply 21 are greatly exaggerated, and the normal undulations of the wet-microcontracted paper ply 22 are not shown in order to more clearly depict the source of the extra length of ply 21 between the adhered areas which is available to induce the puckering shown in FIG. 3. The dry-creped ply 21 and the WMC-paper ply 22 have been juxtaposed, dry-embossed, and adhesively adhered together as disclosed in U.S. Pat. No. 3,414,459 which issued Dec. 3, 1968 to E. R. Wells. That is, plies 21 and 22 are embossed and adhesively adhered together in confronting regions 23, while their remaining portions retain their original characters. Preferably, the embossments of plies 21 and 22 are so configured and disposed that the unadhered portions of plies 21 and 22 are in Z-direction spaced relation to enhance the dry bulk impression of the paper although it is not intended to thereby limit the present invention to paper products having such Z-direction spaced unbonded portions, or to paper products having embossed plies. Moreover, although all of the confronting embossed portions of the plies of product 20, FIG. 2, are adhered together as with a bonding adhesive, it is not intended to thereby limit the invention to either such products having all of such confronting embossed portions adhered together or to such products wherein adherence is achieved by adhesive bonding material.

FIG. 3 depicts the exemplary two-ply paper product 20 as shown in FIG. 2 after the product has been wetted. Wetting causes the crepe ridges 24 of ply 21 to unfold. However, because of the higher stress/strain modulus of ply 22 through its low range of extensibility as compared to ply 21, ply 22 constrains ply 21 from being elongated substantially in the plane of the paper. Thus, as the crepe ridges unfold due to the relief of crepe induced stresses, the unadhered portions of ply 21 pucker up in the Z-direction. This puckering phenomenon enhances the wet bulk of the paper as well as its liquid absorbency.

Figure 4:
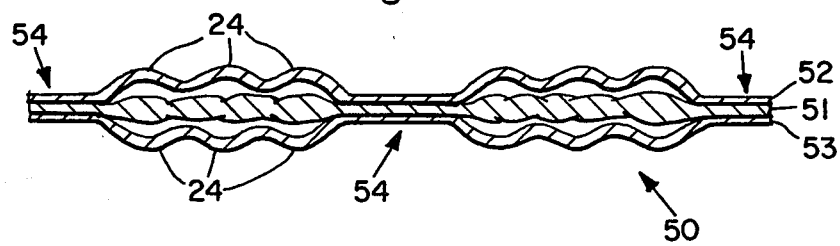
FIG. 4 is a somewhat schematic, enlarged scale, fragmentary sectional view of an illustrative three-ply tissue paper product embodiment of the present invention.
Figure 5:
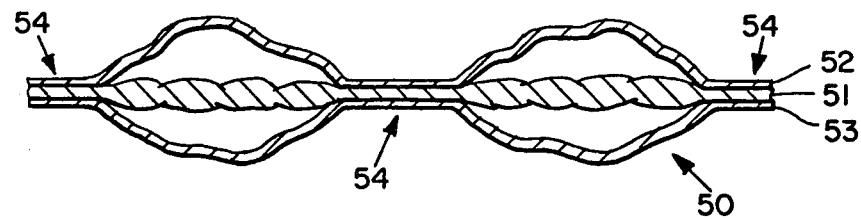
FIG. 5 is a view of the illustrative product shown in FIG. 4 after the product has been wetted.

FIG. 4 is a fragmentary sectional view which is similar to FIG. 2 and which shows an exemplary three-ply embodiment of the present invention: i.e., paper product 50 comprising an extensible center ply 51 (e.g., a wet-foreshortened web) disposed between two extensible dry-creped plies 52 and 53, and adhered together in the regions designated 54. Ply 51 is made to have a sufficiently higher stress/strain modulus in its low range of extensibility as compared to plies 52 and 53 that, upon wetting the product, plies 52 and 53 are constrained by ply 51 from elongating in the plane of the paper as the crepe ridges 24 of plies 52 and 53 unfold. Thus, the unadhered creped portions of plies 52 and 53 pucker in the Z-direction as is shown in FIG. 5. As stated hereinabove with respect to the puckering of product 20, such puckering enhances the wet bulk of the paper product, and increases its liquid absorbency.

Figure 6:
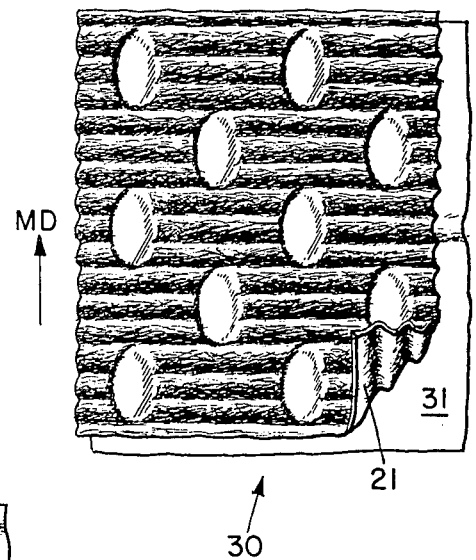
FIGS. 6 and 7 are somewhat schematic, enlarged scale plane views of partially peeled apart fragmentary portions of two-ply tissue paper embodiments of the present invention which have bimodal stress/strain properties.
Figure 7:
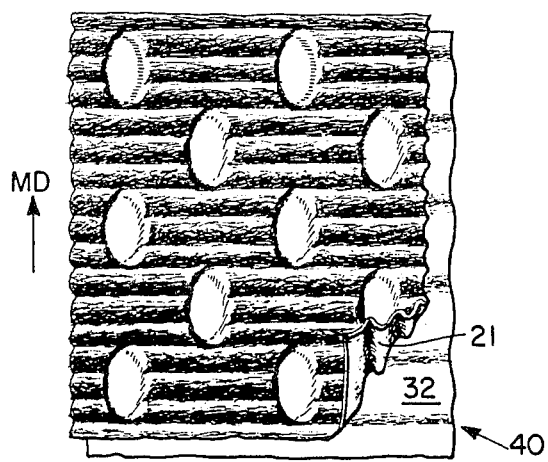

FIGS. 6 and 7 are plan views which are similar to FIG. 1 but in which the back plies 31 and 32 of products 30 and 40, respectively, are dry-creped two percent (2%) and ten percent (10%), respectively, whereas the back ply 22 of product 20, FIG. 1, is wet-foreshortened paper as described hereinbefore. The front ply 21 of products 20, 30, and 40, FIGS. 1, 6, and 7 are substantially identical; and all of the products were converted in the manner previously described with respect to product 20. That is, in accordance with the previously referenced Wells patent.

Figure 8:
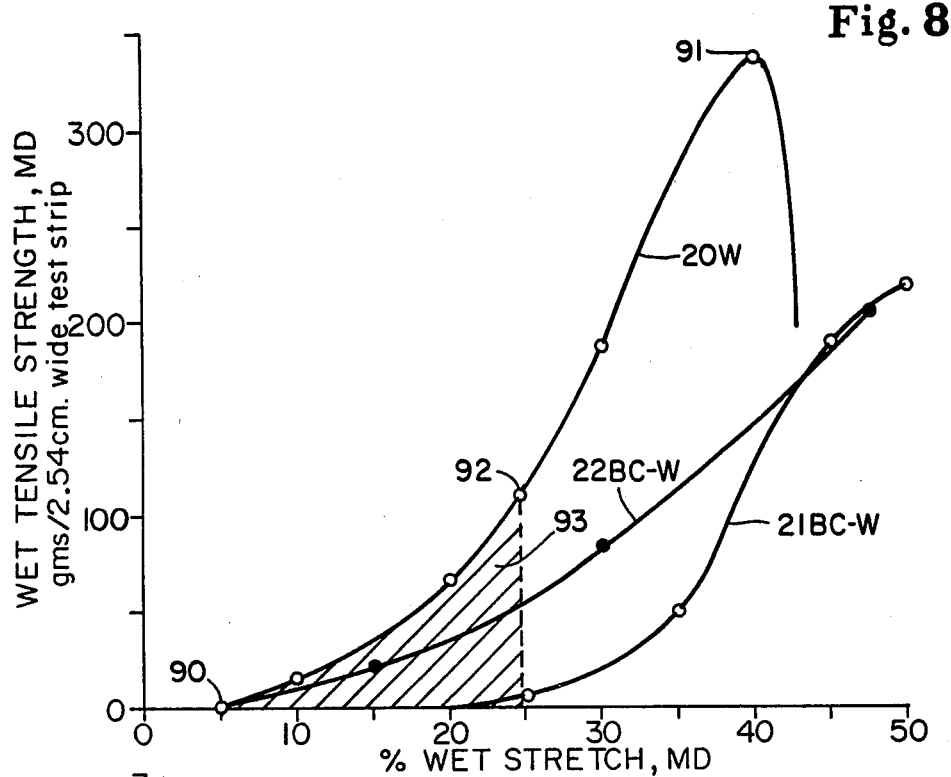
FIGS. 8 and 9 are graphs of wet and dry stress/strain data, respectively, derived from a two-ply tissue paper product embodiment of the present invention as shown in FIG. 1, and from samples of the two types of paper from which the product was converted.
Figure 9:
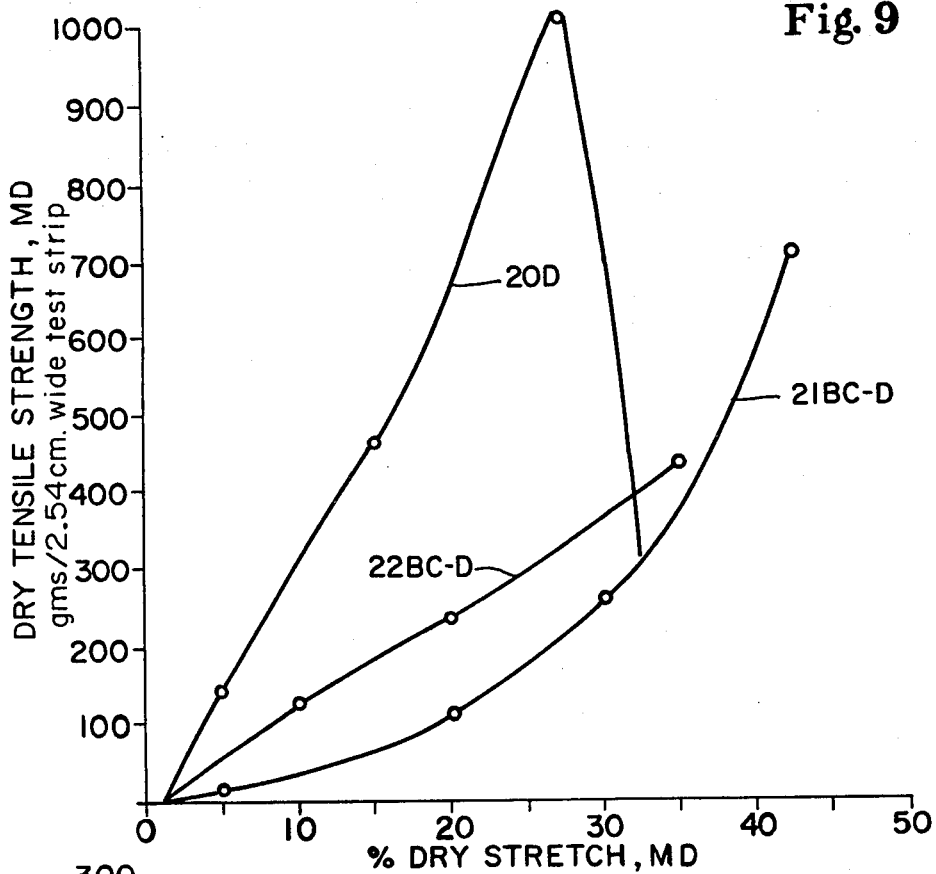

FIGS. 8 and 9 are, as stated hereinbefore, graphs of wet and dry stress/strain data, respectively derived from samples of a two-ply tissue paper product embodiment of the present invention as shown in FIG. 1, and from samples of the two types of paper from which the product was converted; and which samples were made and tested as described herein.

Figure 10:
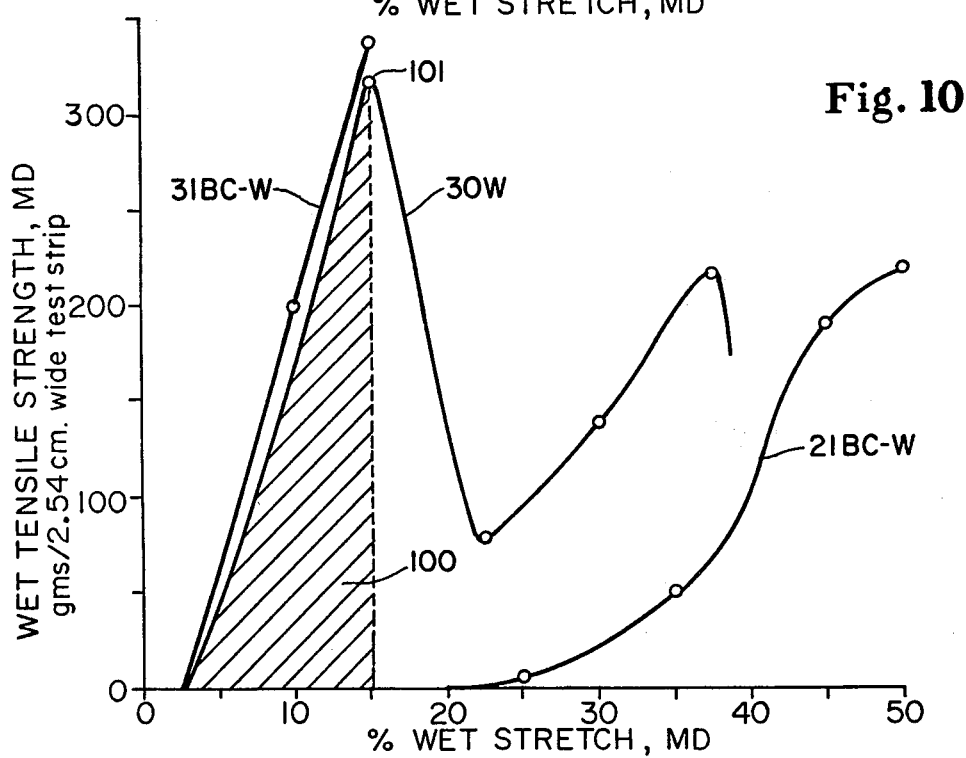
FIGS. 10 and 11 are graphs of wet stress/strain data of the two two-ply tissue paper products shown in FIGS. 6 and 7, respectively and from samples of the two types of paper from which each of those bimodal products was converted.
Figure 11:
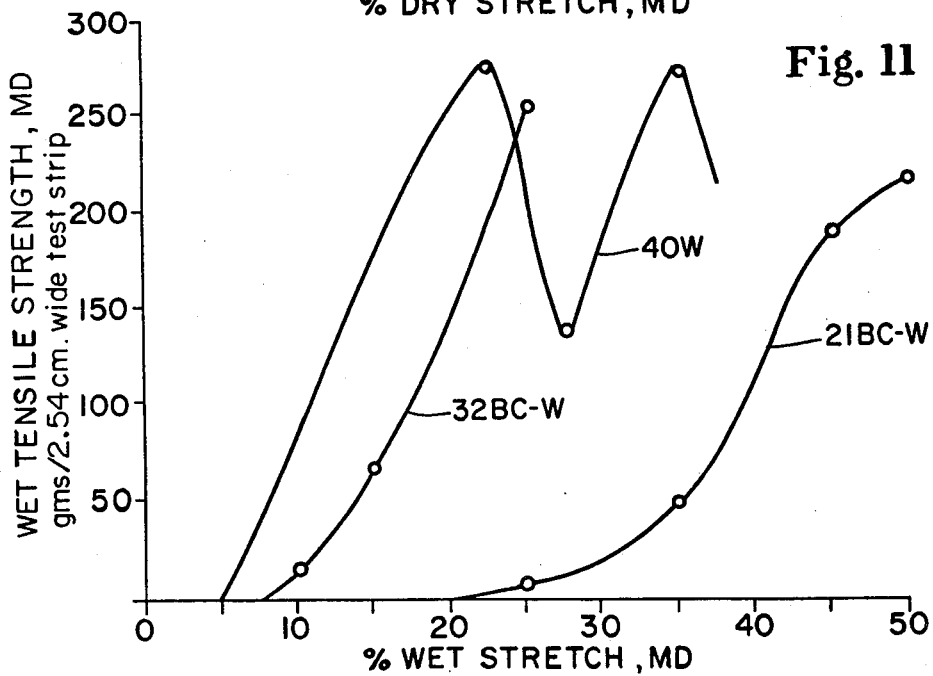

FIGS. 10 and 11 are, as stated hereinbefore, graphs of wet stress/strain data of samples of the two two-ply tissue paper products shown in FIGS. 6 and 7, respectively, and from samples of the two types of paper from which each of those bimodal products was converted; and which samples were made and tested as described herein.

INTRODUCTION TO SAMPLES

Two groups of samples were made and tested to obtain comparative data with respect to embodiments of the present invention and other multi-ply tissue paper products.

Briefly, Sample Group I consisted of three two-ply tissue paper products 20, 30, and 40, FIGS. 1, 6, and 7, respectively, which are of the same general configuration but which were different in the degree and type of machine-direction foreshortening of their back plies 22, 31, and 32, respectively. All had identical front plies as indicated by the front ply of each product being designated ply 21. The papers from which these products were converted are identified in Tables I and II by their respective ply designators with a suffix BC (i.e., before converting). Pertinent data from products 20, 30, and 40 are tabulated in Tables III and IV.

TABLE I

| Paper | Type and Degree of MD Foreshortening | Basis Wt.* | Dry Caliper** |
|---|---|---|---|
| 21BC | Dry-Creped, 25% | 19.0(31.0) | 15.3(0.39) |

TABLE I-continued

| Paper | Type and Degree of MD Foreshortening | Basis Wt.* | Dry Caliper** |
|---|---|---|---|
| 22BC | WMC, 20% | 8.4(30.0) | 14.2(0.36) |
| 31BC | Dry-Creped, 2% | 8.9(30.8) | 9.0(0.23) |
| 32BC | Dry-Creped, 10% | 9.0(31.0) | 12.0(0.30) |

*Pounds/3000 sq. ft. (grams/sq. meter)
**Mils (mm)

TABLE II

| Paper | MD Rupture Tensile Strength* | | MD Stretch, % | |
|---|---|---|---|---|
| | Dry | Wet | Dry | Wet |
| 21BC | 712 | 220 | 12 | 10 |
| 22BC | 445 | 210 | 15 | 18 |
| 31BC | 955 | 335 | 8 | 5 |
| 32BC | 680 | 255 | 16 | 15 |

*gms./inch (2.54 cm.) width.

TABLE III

| Product (Plies) | Basis Wt.* | Caliper** | | Density*** gms/cc | |
|---|---|---|---|---|---|
| | | Dry | Wet | Dry | Wet |
| 20(21,22) | 35.2(57.4) | 25.0(0.635) | 16.6(0.422) | 0.090 | 0.136 |
| 30(21,31) | 36.3(59.2) | 21.2(0.538) | 16.2(0.411) | 0.110 | 0.143 |
| 40(21,32) | 35.0(57.1) | 22.0(0.559) | 15.0(0.381) | 0.102 | 0.149 |

*Pounds/3000 sq. ft. (grams/sq. meter)
**Mils (mm)
***Computed from Basis Weight and Caliper Data

TABLE IV

| Product (Plies) | Wet MD Tensile Strength Conversion Efficiency | Reid Absorption Time, Seconds | H.A.C.* | |
|---|---|---|---|---|
| | | | G/S** | G/G*** |
| 20(21,22) | 79% | 23.2 | 64.0 | 4.4 |
| 30(21,31) | 57% | 28.6 | 63.7 | 3.9 |
| 40(21,32) | 59% | 32.9 | 57.8 | 3.0 |

*Horizontal Absorptive Capacity
**grams per sample sheet
***grams per gram of fiber of sample sheet All three of the Group I samples comprised a twenty-five percent (25%) dry-creped ply 21 and a second ply which plies were embossed and discontinuously adhesively laminated together in accordance with U.S. Pat. No. 3,414,459—Wells. In product 20, FIG. 1, an exemplary embodiment of the present invention, the second ply was a twenty percent (20%) wet-microcontracted ply 22; in product 30, FIG. 6, the second ply was a two-percent (2%) dry-creped ply 31; and in product 40, FIG. 7, the second ply was a ten-percent (10%) dry-creped ply 32. Thus, the plies of product 20 were different in the degree and type of foreshortening (i.e., 20%-wet v. 25%-dry) whereas the plies of products 30 and 40 differed only in the degree of dry-foreshortening (dry-crepe). By way of comparison, product 20 has a strength efficient structure which is manifested by a monomodal stress/strain property as opposed to products 30 and 40 being substantially less strength efficient as manifested by bimodal wet stress/strain properties as described hereinbefore. However, all manifest high tensile energy absorption relative to similar products wherein one ply is relatively inextensible: e.g., such products as disclosed in U.S. Pat. No. 3,953,638—Kemp albeit the Kemp structures comprise three-plies of which the middle ply is said to have less than about ten percent (10%) stretch.

More specifically, still referring to Sample Group I, four (4) types (i.e., different degrees and types of machine-direction foreshortening) of tissue paper were made and are hereby identified in Tables I and II by designators 21BC, 22BC, 31BC and 32BC. Upon conversion to make products 20, 30 and 40, papers 21BC, 22BC and 32BC became plies 21, 22, and 31 and 32, respectively. That is, for example, the paper which became ply 21 of products 20, 30, and 40 is designated 21BC in Tables I and II. In the same vein, the designators for wet and dry samples of these papers have suffixes W and D, respectively, in the graphs shown in FIGS. 8 through 11, inclusive: for instances, the curve designated 21BC-W in FIG. 8 was derived from wet samples of the pre-conversion paper 21BC which, upon conversion, became ply 21 of product 20, FIG. 1. To avoid unduly redundant descriptions, these distinguishing suffixes are used throughout the remainder of the sample descriptions.

Papers 21BC, 22BC, 31BC and 32BC were made and reeled in accordance with U.S. Pat. No. 4,191,609 which issued to P. D. Trokhan on Mar. 4, 1980; and all were made from the same furnish (northern softwood kraft), in the same papermaking machine, and under the same conditions albeit for the type and degree of machine-direction foreshortening. Additionally, these papers had their high density zones impregnated with a latex binder material which are applied by a rotogravure apparatus prior to disassociating them from the imprinting/carrier fabric of the papermaking machine.

Reels of papers 21BC and 22BC, Table I, were converted into product 20, FIG. 1, consisting of plies 21 and 22, respectively, by embossing them and laminating them together as shown in FIGS. 1 and 2, and as disclosed in U.S. Pat. No. 3,414,459—Wells. Four wet and dry samples of each of the papers 21BC and 22BC, and of product 20 were stress/strain tested and averaged (i.e., data from each set of four samples was averaged) to generate the data which are plotted in FIGS. 8 and 9, respectively.

Still referring to FIGS. 8 and 9, papers 21BC and 22BC (i.e., curves 21BC-W and 21BC-D, and 22BC-W and 22BC-D) were sufficiently matched with respect to their elongation at rupture values that the stress/strain curves 20W and 20D for the wet and dry product 20, respectively, were monomodal. However, curves 20W and 20D are not the arithmetic sums of curves 21BC-W and 22BC-W; and of 21BC-D and 22BC-D, respectively. The differences in their elongation at rupture values are primarily due to some potential elongaton of the papers being pulled out incident to their being converted into product 20; and the peak tensile strengths are not the arithmetic sums of the component ply papers due to complex factors such as the strengthening imparted by adhesive used to laminate the plies together with a pattern of discrete adhered regions, and due to the fact that some intra-ply paper bonds are broken by embossing as an incident to converting. The portions of curves 20W and 20D to the right of the peaks reflect the decay of the tensile force after rupture of the product has occured and before the test apparatus was turned off.

Continuing to refer to FIGS. 8 and 9, the characters of curve 21BC-W with respect to curve 22BC-W, and of curve 21BC-D with respect to curve 22BC-D are, respectively, different: curve 21BC-W being substantially more upwardly concave than curve 22BC-W, especially below forty percent wet stretch; and curve 22BC-D being substantially linear whereas curve 21BC-D has a high degree of upward concavity. Also, curves 22BC-W and 22BC-D are substantially higher than curves 21BC-W and 21BC-D, respectively, through the low and intermediate thirds of the range of the MD stretch/extensibility of product 20 (curves 20W and 20D, FIGS. 8 and 9, respectively). This relationship— especially when wet—infers the relationship between plies 21 and 22 per se of product 20 which precipitates high liquid absorption in products 20 derived therefrom as has been described hereinbefore.

Parenthetically, one would expect the stress/strain curves of plies 21 and 22 (not shown) to be shifted somewhat leftward from the stress/strain curves of their respective parent pre-conversion tissue papers due to some MD extensibility normally being pulled out incident to being converted from reeled papers into a multi-ply tissue paper product. Thus, as stated just above, the relationships among the stess/strain curves of the plies and the product may be inferred from the relationships among the pre-conversion papers and the product which are shown in FIGS. 8 through 11, inclusive.

Continuing still further to refer to FIGS. 8 and 9, although the papers from which plies 21 and 22 of the described exemplary embodiment were made were sufficiently matched to precipitate monomodal stress/strain curves for both wet and dry samples of product 20 (i.e., curves 20W and 20D, respectively), it is not intended to thereby limit the present invention. Rather, matching the plies to provide products having either a wet or dry monomodal stress/strain property is deemed to be within the scope of the present invention. Indeed, as exemplified by products 30 and 40 having bimodal wet stress/strain moduli, FIGS. 10 and 11 respectively, monomodality is not essential for either wet or dry samples so long as they have high tensile energy absorption and liquid absorbency as described hereinbefore.

Referring now to products 30 and 40, FIGS. 6 and 7, respectively, reels of papers 21BC and 31BC, Table I, were converted into product 30, FIG. 6, and reels of paper 21BC and 32BC, Table I, were converted into product 40, FIG. 7, by embossng them and laminating them together as described hereinbefore with respect to product 20, FIG. 1: i.e., in accordance with U.S. Pat. No. 3,414,459—Wells. Four wet samples of each of the papers 21BC, 31BC, and 32BC, and of products 30 and 40 were stress/strain tested and averaged (i.e., data from each set of four samples was averaged) to generate the data which are plotted in FIGS. 10 and 11.

Still referring to FIGS. 10 and 11, papers 21BC, 31BC and 32BC (i.e., curves 21BC-W, 31BC-W, and 32BC-W) were sufficiently different with respect to their elongation at rupture values that the stress/strain curves 30W and 40W of the wet samples of products 30 and 40, FIGS. 10 and 11, respectively, are bimodal: i.e., have two peaks.

Notwithstanding the fact that products 30 and 40 have bimodal stress/strain curves, they nonetheless have relatively high tensile energy absorption values—at least up to their first peaks (i.e., the rupture point of their least extensible plies)—than were their least extensible plies substantially less extensible: e.g., having wet MD extensibilities of less than ten percent. For example, referring to FIG. 10, the partial, pre-first-ply-rupture TEA value for wet samples of product 30 is the shaded area 100 under curve 30W and to the left of peak 101; and was measured to be about eighteen-hundred grams/inch. It is believed to be obvious that the corresponding partial Wet-TEA value would be substantially less if the paper from which ply 31 were made had equal strength but substantially less wet MD extensibility than the graphed sample. That is the area of the nearly triangular TEA area 100 would be directly reduced as the slope of the hypotenuse of the triangle was increased (e.g., for samples having lower values of MD extensibility but equal rupture strength).

SAMPLE GROUP II

Briefly, Sample Group II comprised three two-ply products. These were made and tested to illustrate that synergistic absorbency is derived from combining plies having substantially identical stretch but which were made sufficiently different that unadhered portions of one ply will pucker in the Z-direction when the product is wetted, as compared to combining two of each of the dissimiliar plies together. For example, consider a first ply to be twenty percent (20%) wet-microcontracted and a second ply to be twenty-five percent (25%) dry-creped. A product comprising such a first ply and such a dissimilar second ply which are discontinuously adhered together has substantially greater absorbency than either a two-ply product consisting of two such first plies or a two-ply product consisting of two such second plies. Pertinent data from these two-ply products and the papers from which they were converted are tabulated in Tables V and VI, respectively.

TABLE V

| Paper Sample No. | Type & Degree of MD Fore-shortening | Reeled Basis Weight* | Reeled Caliper mils (mm) |
|---|---|---|---|
| KK 31-BC | 25% Dry-Creped | 18.4(30.0) | 17.1(0.434) |
| KK 33-BC | 20% WMC | 16.8(27.4) | 14.8(0.376) |

*Pounds per 3000 sq. feet (grams per sq. meter)

TABLE VI

| Product | Wet MD Tensile Strength Conversion Efficiency | Reid Absorption Time, Seconds | H.A.C. G/S | H.A.C. G/G |
|---|---|---|---|---|
| KK 31/31 | 77% | 19.0 | 44.6 | 13.1 |
| KK 31/33 | 69% | 16.0 | 57.0 | 15.2 |
| KK 33/33 | 73% | 17.0 | 49.9 | 13.5 |

TEST DESCRIPTIONS

Generally speaking, the Group I and II samples were tested as briefly described in the following test procedures.

Dry Caliper

This test was run on a motorized micrometer such as Model 549 which is available from Testing Machines, Inc. of Amityville, Long Island, N.Y. Product samples were subjected to a loading of 80 gm. per sq. in. under a two inch (5.08 cm.) diameter anvil. The micrometer was zeroed to assure that no foreign matter was present beneath the anvil prior to inserting the samples for measurement, and calibrated to assure proper readings. Measurements were read directly from the dial on the micrometer and are expressed in mils (mm.) in Tables I, III, and V.

Wet Caliper

This test was run utilizing the same instrument and the same basic procedures utilized to measure dry caliper except that the product samples were first saturated with water by immersing them and then gravity draining them for about three seconds while holding them in a slightly inclined attitude to remove excess water prior to making the measurement.

Dry MD Tensile Strength

These data were obtained on an electronic tensile tester such as a Thwing-Albert Model QC tensile tester such as is available from the Thwing-Albert Instrument Company of Philadelphia, Pa. Product samples were cut which were one inch wide by at least six inches long in the machine direction. Each sample strip was placed in the jaws of the tester, set at four inches (10 cm.) gauge length. The crosshead speed during the test was four (4) inches (about 10 cm.) per minute. Readings were taken directly from the scale on the tester at the point of rupture and are expressed in grams/inch (gms./2.54 cm.) in Table II, and on FIG. 9.

Wet MD Tensile Strength

These data were obtained on the same instrument used to obtain dry tensile strength. However, each sample was saturated with water after it was clamped in the tester but before movement of the crosshead jaws of the tester began. Such wetting floated out some of the extensibility of the samples before the crosshead movement started which, for example, accounts for curve 21BC-W having its X-axis intercept at about twenty percent (20%) wet stretch, FIGS. 8, 10, and 11.

Wet MD Tensile Strength Conversion Efficiency

These data, Tables IV and VI, were generated by calculations rather than direct tests per se. For example, the 79% value for product 20, Table IV, was calculated by first summing the MD wet tensile strengths of the papers 21BC and 22BC from Table II (i.e., 220 and 210, respectively). Then, that sum (i.e., 430) was divided into the MD wet tensile strength at rupture of product 20 (about 340 as read from curve 20W, FIG. 8), and expressed as a percent. The conversion efficiency data tabulated in Table IV evidences the strength efficiency of the exemplary monomodal embodiment of the present invention (i.e., product 20) as compared to the exemplary bimodal embodiments of the present invention (i.e., products 30 and 40).

Tensile Energy Absorption: TEA

TEA is defined as the energy or work absorbed per unit of surface area of a sample as the sample is tensile strength tested until it ruptures. A partial TEA is the energy or work absorbed as the tensile force is increased from one level to another: e.g., from zero to the level of stress required to break the first ply of a multi-ply product. The TEA of a product can be obtained by clamping a one-inch (2.54 cm.) wide dry specimen in two spaced sets of jaws when they are four inches (about 10 cm.) apart, and with any noticeable slack being pulled out of the strip before it is clamped. Strain is then applied to the specimen by moving the jaws further apart at a constant rate of four inches/minute (10 cm./min.) while recording the elongation in inches and the load in grams until breakage of the specimen. To obtain wet TEA's, the samples are saturated with water after being clamped, dry, between the jaws with all of the dry slack pulled out of them. The area under the load-elongation curve is then measured, for example, by an electronic integrator. The TEA is then calculated using the equation:

TEA = 100A/LW

The units of TEA are gram-inches per square inch (or grams/inch) where:
- A = area under load-elongation curve in gram-inches;
- L = initial span between clamp lines in inches; and
- W = initial width of specimen in inches.

However, when the data are plotted as stress/strain curves (e.g., FIGS. 8-11), each TEA is simply the relevant area under its respective curve. For example, the average WET-TEA for the samples of product 20 from which curve 20W, FIG. 8, was derived can be obtained by integrating the area under the portion of the curve which extends from its X-axis intercept 90 to its peak 91. This was done and the resulting computed WET-TEA is about forty-five hundred grams/inch. In the same vein, the partial WET-TEA for product 20 for the range of stress from zero to point 92 was computed to be about seven-hundred-seventy-five grams/inch by measuring the shaded area 93 in FIG. 8. Point 92 is at the stress level equal to one-third the stress level of point 91. As is evident from FIG. 8, the WET-TEA contribution of ply 22 is inferentially substantially greater than for ply 21 by virtue of the portion of area 93 under curve 22BC-W being much greater than the corresponding portion of area 93 under curve 21BC-W. Parenthetically, the sum of those partial WET-TEA areas under curves 21BC-W and 22BC-W do not equal the partial WET-TEA area under curve 20W due to converting factors as described hereinbefore. Moreover, it is apparent that products having substantial MD elongation would have higher TEA values than relatively inextensible products having the same MD rupture stress value. Such higher TEA values correlate with consumer perceived product strength properties.

MD Stretch

MD stretch is the percent machine direction elongation of a structure prior to rupture and is read directly from a secondary scale on the Thwing-Albert tensile tester. Wet and dry MD stretch readings were taken concurrently with wet and dry tensile strength readings.

Rate of Absorption: Reid Test

This test comprises measuring the time in seconds required for 0.10 ml. of distilled water to be absorbed by a single 4 in. by 4 in. product samples using a Reid style tester such as is described in detail in an article by S. G. Reid entitled "A Method for Measuring the Rate of Absorption of Water by Creped Tissue Paper," which appears at pages T-115 to T-117 to Pulp and Paper Magazine of Canada, Volume 68, No. 3, Convention Issue, 1967. Tests were conducted by simultaneously opening a stopcock located between a calibrated pipette and a capillary tip contacting the product sample and starting a timer; observing the water level in the pipette as the water was being absorbed by the product sample; and stopping the timer when exactly 0.10 ml. of water had been dispensed from the calibrated pipette. Readings were taken directly from the timer and are expressed in seconds. Lower times are indicative of a higher rate of water absorption.

Horizontal Absorptive Capacity Test (H.A.C.)

The test determines the amount of distilled water absorbed and retained by an absorbent product while in the horizontal position. All samples were sheets having a MD length of about nine-and-eight-tenths inches (about 24.9 cm.) and a width of about eleven inches (about 27.9 cm.), and were conditioned for a minimum of two hours at 72° C. ± 2° F. and 50% ± 2% RH prior to testing. The following procedure was used. The DRY WEIGHT of a first conditioned sample (A) was determined to the nearest 0.01 grams. A special holder comprised of an aluminum frame strung in a predetermined gridlike fashion with nylon monofilament of 0.012 in. (0.3 mm.) diameter was tared. The sample was placed on the grid of the holder, covered with a like holder to prevent movement while in the bath, and submerged in distilled water at 72° F. (about 23° C.) for 30± seconds. The sample was then gently withdrawn from the bath and allowed to drain in the horizontal position for 120± 5 seconds. While the sample was draining, the cover device was removed and all excess water was wiped from the frame of the sample holder. The weight of the wet sample plus the holder was then determined to the nearest 0.01 gm. while the wet sample was maintained horizontal in the holder. The sample holder tare weight was then substracted to yield the weight of the wetted sample (WET WEIGHT). The procedure was repeated with a second sample (B). Sample B was oriented in the sample holder in a direction orthogonal to that of sample A. The absorbency, both the weight of water per sheet and the weight of water per unit weight of fiber is the arithmetic average of the two samples. These values were calculated in the following manner and tabulated in Tables IV and VI.

$$\text{WEIGHT OF H}_2\text{O/SHEET} = \frac{\text{WET WEIGHT}_A - \text{DRY WEIGHT}_A + \text{WET WEIGHT}_B - \text{DRY WEIGHT}_B}{2}$$

$$\text{WEIGHT OF H}_2\text{O/UNIT WEIGHT OF FIBER} = \frac{1}{2}\left(\frac{\text{WET WEIGHT}_A}{\text{DRY WEIGHT}_A} + \frac{\text{WET WEIGHT}_B}{\text{DRY WEIGHT}_B}\right) - 1$$

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of this invention.

What is claimed is:

1. An extensible multi-ply tissue paper product comprising a first ply and a second ply of tissue paper in associated relation with substantial juxtaposed portions thereof not adhered together, said plies comprising tissue papers having greater than ten percent extensibility in the primary direction of said product and having elongation at rupture values in said primary direction that are sufficiently close in value that said product has a monomodal stress/strain character in said primary direction, said first ply having a sufficiently higher stress/strain property than said second ply that unadhered portions of said second ply will pucker in the Z-direction of the product when the product is wetted.

2. The extensible multi-ply tissue paper product of claim 1 wherein said plies have greater than said ten percent extensibility in said primary direction before said product is wetted.

3. The extensible multi-ply tissue paper product of claim 1 wherein said plies have greater than said ten percent extensibility in said primary direction when said product is wet.

4. The extensible multi-ply tissue paper product of claim 2 or 3 wherein said first ply has a sufficiently higher stress/strain curve than said second ply through the lowest one-third of a principal range of stress of said product that unadhered portions of said second ply will pucker in the Z-direction of the product when the product is wetted, said primicipal range of stress extending from zero to the level of stress at which said first ply ruptures, and said higher stress/strain curve of said first ply relative to said second ply being manifested by the partial TEA contribution of said first ply to the partial TEA of the product being substantially greater than the corresponding partial TEA contribution of said second ply over said lowest one-third of said principal range of stress of said product.

5. The extensible multi-ply tissue paper product of claim 4 comprising a third ply substantially identical to said second ply and juxtaposed the opposite side of said first ply from said second ply.

6. The extensible multi-ply tissue paper product of claim 1 wherein each said ply has from about fifteen to about thirty percent extensibility in said primary direction.

7. The extensible multi-ply tissue paper product of claim 1 wherein the partial TEA contribution derived from said first ply is about two times as great or greater than the partial TEA contribution derived from said second ply when said product is elongated about ten percent in said primary direction.

8. The extensible multi-ply tissue paper product of claim 1 wherein the stress/strain modulus of said first ply in said primary direction is about twice as great or more than the corresponding modulus of said second ply in the range of elongation of said product of from about five to about ten percent in said primary direction.

9. The extensible multi-ply tissue paper product of claim 1 wherein the stress/strain character of said first ply is substantially different from the stress/strain character of said second ply.

10. The extensible multi-ply tissue paper product of claim 9 wherein said primary direction is the machine direction of each said ply as laid, said second ply comprising tissue paper having a substantially non-linear stress/strain character which manifests a relatively low MD stress/strain modulus through the lowest one-third of the range of MD extensibility of said product and a substantially greater MD stress/strain modulus through the highest one-third of the range of MD extensibility of said product.

11. The extensible multi-ply tissue paper product of claim 10 wherein said first ply comprises extensible tissue paper having a substantially more linear MD stress/strain character than the MD stress/strain character of said second ply.

12. The extensible multi-ply tissue paper product of claim 10 wherein said first ply comprises extensible tissue paper having a reversely curved MD stress/strain character relative to the MD stress/strain character of said second ply.

13. The extensible multi-ply tissue paper product of claim 1 wherein said first ply has a MD elongation at rupture value of from about eighty percent to about one-hundred-twenty percent of the MD elongation at rupture value of said second ply.

14. The extensible multi-ply tissue paper product of claim 13 wherein said first ply has a MD elongation at rupture value of from about ninety percent to about one-hundred-ten percent of the MD elongation at rupture value of said second ply.

15. The extensible multi-ply tissue paper product of claim 1 wherein the tissue papers comprising said first ply and said second ply have each undergone MD foreshortening in the range of from about ten percent to about forty percent during their manufacture.

16. The extensible multi-ply tissue paper product of claim 15 wherein said MD foreshortening of each said ply is in the range of from about fifteen to about thirty percent.

17. The extensible multi-ply tissue paper product of claim 1 wherein said primary direction is the machine direction (MD) of said tissue paper, and said product has said monomodal stress/strain character when wet.

18. The extensible multi-ply tissue paper product of claim 1 wherein said first ply is wet-microcontracted tissue paper.

19. The extensible multi-ply tissue paper product of claim 18 wherein the MD elongation at rupture values of said plies are so related that said product has a monomodal MD stress/strain character.

20. The extensible multi-ply tissue paper product of claim 19 wherein said product has said monomodal MD stress/strain character when wet.

21. The extensible multi-ply tissue paper product of claim 1 wherein said plies are discontinuously bonded together.

22. The extensible multi-ply tissue paper product of claim 1 wherein said plies are sufficiently embossed that at least about fifty (50) percent of their confronting surfaces are disposed in spaced apart relation.

23. The extensible multi-ply tissue paper product of claim 22 wherein said plies are discontinuously bonded together.

24. The extensible multi-ply tissue paper product of claim 1, 6, 9, 13, 14, 15, 16, or 18 comprising a third ply substantially identical to said second ply and juxtaposed the opposite side of said first ply from said second ply.

25. The extensible multi-ply tissue paper product of claim 24 wherein the MD elongation at rupture values of said second ply and said third ply are so related to the MD elongation at rupture value of said first ply that said product has a monomodal MD stress/strain character.

26. The extensible multi-ply tissue paper product of claim 25 wherein said product has said monomodal MD stress/strain character when wet.

27. An extensible multi-ply tissue paper product comprising a first ply and a second ply of tissue paper in associated relation with substantial juxtaposed portions thereof not adhered together, said plies comprising tissue papers having greater than ten percent extensibility in the machine direction of said product, said first ply having a sufficiently higher stress/strain property than said second ply that unadhered portions of said second ply will pucker in the Z-direction of the product when the product is wetted, said plies having stress/strain properties which are so related that the partial TEA contribution derived from said first ply is about two times as great or greater than the partial TEA contribution derived from said second ply when said product is elongated about ten percent in said machine direction, said second ply comprising tissue paper having a substantially non-linear stress/strain character which manifests a relatively low MD stress/strain modulus through the lowest one-third of its range of MD extensibility and a substantially greater MD stress/strain modulus through the highest one-third of its range of MD extensibility, said plies having MD elongation at rupture values which are so related that said product has a monomodal stress/strain character, and said plies comprise tissue papers which were each MD foreshortened from about fifteen to about thirty percent during their manufacture.

28. The extensible multi-ply tissue paper products of claim 27 wherein said product has said monomodal MD stress/strain character when wet.

29. The extensible multi-ply tissue paper product of claim 27 wherein each said ply has from about fifteen to about thirty percent MD extensibility.

30. The extensible multi-ply tissue paper product of claim 27 wherein said first ply has an MD elongation at rupture value which is from about ninety to about one-hundred-ten percent the MD elongation at rupture value of said second ply.

31. The extensible multi-ply tissue paper product of claim 27 wherein said plies are sufficiently embossed that at least fifty (50) percent of their confronting surfaces are disposed in spaced apart relation.

32. The extensible multi-ply tissue paper product of claim 27, 29, 30, or 31 comprising a third ply substantially indentical to said second ply and disposed adjacent the opposite side of said first ply from said second ply.

33. The extensible multi-ply tissue paper product of claim 32 wherein said product has said monomodal MD stress/strain character when wet.

* * * * *